US008810384B1

(12) United States Patent
Bowman

(10) Patent No.: US 8,810,384 B1
(45) Date of Patent: Aug. 19, 2014

(54) THERMAL LINK WARNING SAFETY SYSTEM FOR UNATTENDED VEHICLES

(71) Applicant: Christopher Bowman, Boardman, OH (US)

(72) Inventor: Christopher Bowman, Boardman, OH (US)

( * ) Notice: Subject to any disclaimer, the term of this patent is extended or adjusted under 35 U.S.C. 154(b) by 154 days.

(21) Appl. No.: 13/623,957

(22) Filed: Sep. 21, 2012

Related U.S. Application Data

(60) Provisional application No. 61/626,160, filed on Sep. 22, 2011.

(51) Int. Cl.
*B60Q 1/00* (2006.01)
*B60Q 5/00* (2006.01)

(52) U.S. Cl.
CPC .................................... *B60Q 5/005* (2013.01)
USPC ........................................ 340/438; 340/425.5

(58) Field of Classification Search
CPC ............... G08C 17/02; B60H 1/00742; B60R 16/0232; B60R 25/1004; G08B 21/02
See application file for complete search history.

(56) References Cited

U.S. PATENT DOCUMENTS

| | | | | |
|---|---|---|---|---|
| 6,028,509 | A * | 2/2000 | Rice | 340/449 |
| 6,922,622 | B2 * | 7/2005 | Dulin et al. | 701/45 |
| 7,701,358 | B1 * | 4/2010 | White et al. | 340/667 |
| 8,346,432 | B2 * | 1/2013 | Van Wiemeersch et al. | 701/36 |
| 2011/0071734 | A1 * | 3/2011 | Van Wiemeersch et al. | 701/49 |

* cited by examiner

*Primary Examiner* — Travis Hunnings
(74) *Attorney, Agent, or Firm* — Harpman & Harpman

(57) ABSTRACT

A mobile personal alarm and warning system for monitoring temperature around the designated user integrated with a vehicle access and warning controls. The system utilizes controls and actuation mobile self-contained modules that monitor the ambient temperature around the designated user and transmits a warning activation signal to the mobile control unit carried by the primary user as an alert condition. Proximity sensor provisions are provided to assure response range between the modules as well as enabling two-way radio communication protocols.

9 Claims, 3 Drawing Sheets

THERMAL LINK WARNING SAFETY SYSTEM FOR UNATTENDED VEHICLES

This application claims the benefit of U.S. Provisional Application No. 61/626,160, filed Sep. 22, 2011.

BACKGROUND OF THE INVENTION

1. Technical Field

This invention relates to temperature sensing and warning systems for vehicles in which children or pets have been left and unattended.

2. Description of Prior Art

Prior art devices of this type have been developed to provide a variety of sensing and alarm activation systems to monitor the internal temperature of a vehicle's passenger compartment, see for example U.S. Pat. Nos. 5,793,284, 6,263,272, 6,922,622, 7,081,811, 7,742,554, 7,701,358 and U.S. Publication 2007/00775575.

In U.S. Pat. No. 5,793,284, an alarm system for a vehicle is disclosed having a temperature sensor in the vehicle and a remote user paging unit that is activated by an onboard transmitter once the predetermined temperature range has been reached.

U.S. Pat. No. 6,263,272 claims a vehicle having thermal protection arrangement for children and pets in which a temperature sensor may activate power windows and sun roof once a preset temperature is reached.

U.S. Pat. No. 6,922,622 discloses a hot vehicle safety system for vehicles to prevent passengers from being trapped therein when left in the sun. Multiple vehicle control systems are activated for opening automatic door locks, windows and sun roofs while sounding an alarm once the predetermined temperature is reached within the vehicle.

U.S. Pat. No. 7,081,811 illustrates a multiple sensor heat alarm for vehicles. Heat sensors are positioned in different locations in the vehicle and a processor determines acceptable heat index range commanding vehicle's horn, lights, windows, doors and engine.

U.S. Pat. No. 7,472,554 is directed to vehicle passenger protection system wherein multiple sensors monitor temperature, motor and CO2 levels. Once activated by preset sensor levels have been achieved, multiple alarms and reactive actions are taken including window door locks, horn and two-way communication devices.

U.S. Publication 2007/0075575 is drawn to an unattended child car seat alarm system in which an alarm is keyed to the latch of a child's car seat indicating temperature pressure sensor and a microphone for remote key fob usage.

SUMMARY OF THE INVENTION

A mobile alert security system for monitoring the status of individuals and pets in an unattended vehicle by multiple activation alarm elements dependent on prescribed protocols. Self-contained independent sensor monitoring modules are deployed on the designated individuals and pets to be monitored with a master control communication and command module unit carried by the designated user to monitor and maintain the safety of the monitored entities.

DETAILED DESCRIPTION OF THE INVENTION

Figure 1:
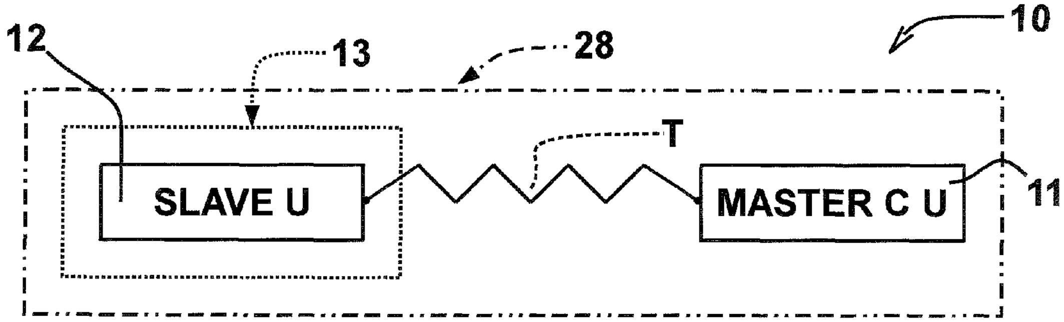
FIG. 1 is a graphic illustration of the system's slave and master control unit monitoring modules.

Referring now to FIGS. 1-4 of the drawings, a thermal link alert system 10 of the invention can be seen. The alert system 10 comprises a master control unit 11 and one or more slave monitoring units 12. The system is designed to provide alert warnings and inter unit communication when designated safety parameters have been exceeded including environmental constraints (temperature) and safety distant protocols proximity between units.

The mobile slave unit 12 is to be worn attached and/or remotely secured to the entity to be monitored such as children and pets and is directed towards monitoring same when they are within a vehicle 13.

Figure 2:
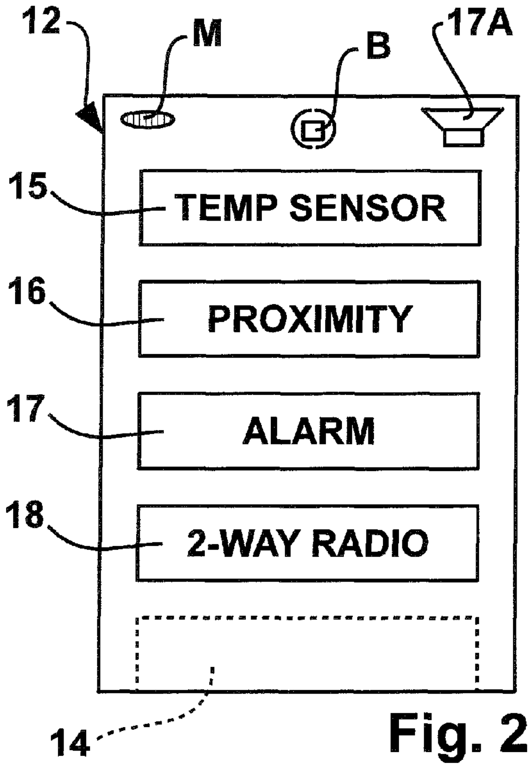
FIG. 2 is a block flow diagram of the slave unit's features.

Referring specifically to FIGS. 1 and 2 of the drawings, the slave unit 12 is self-contained with an onboard source of power 14 and is configured in a convenient adaptable form such as to be positioned on a flexible attachment band, not shown, or other easily secured configuration appropriate to the user's applications. The slave unit 12 has a primary integrated temperature sensor 15 with a control activation alert range, in this example, of 60° Fahrenheit-90° Fahrenheit as well as a proximity sensor 16 defining an operational alert range between the slave unit 12 and the master control unit 11 as will be described in greater detail hereinafter.

An alarm activation circuit 17 and audio output 17A is provided for response to the primary temperature sensor 15 and proximity sensor 16 with an interconnected transmitter receiver circuit configuration 18 for both data transmission and two-way audio communication between the respective units.

Figure 3:
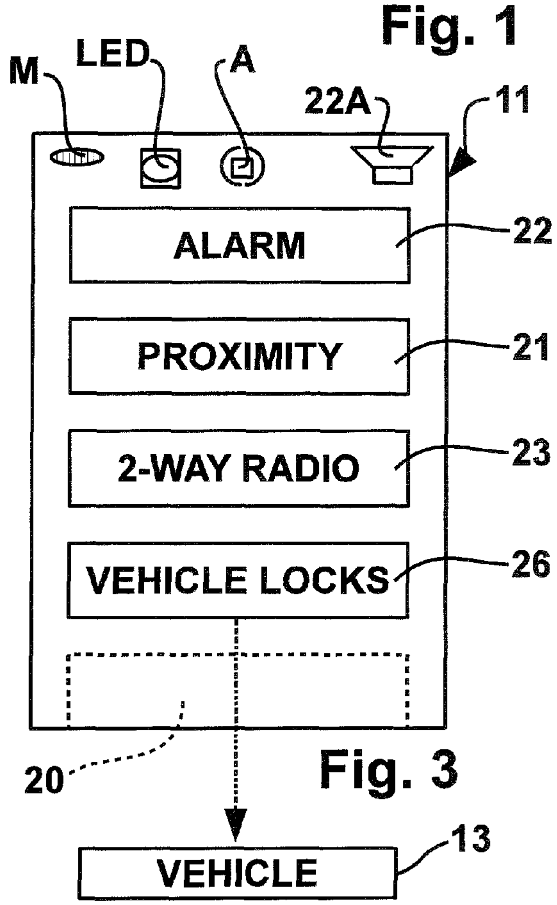
FIG. 3 is a block flow diagram of the master control unit features.

Referring now to FIGS. 1 and 3 of the drawings, the mobile master control unit 11 configuration can be seen having a source of power 20 with a corresponding proximity sensor 21 interconnected thereto. The proximity sensors 16 and 21 which may be of any of the well know sensor configurations including, but not limited to a group to include magnetic, in this example.

A corresponding alarm circuit 22 and audio output 22A is provided and a transmitter receiver 23 for both activation control data and two-way voice communication with the slave unit 12 by corresponding microphones M and audio output speakers 22A and 17A interconnected thereto on respective master and slave units 11 and 12.

An automatic vehicle unlock transmitter circuit 26 is provided to assure safe exit from the vehicle 13 if so equipped and activated as will be described in detail.

Figure 5:
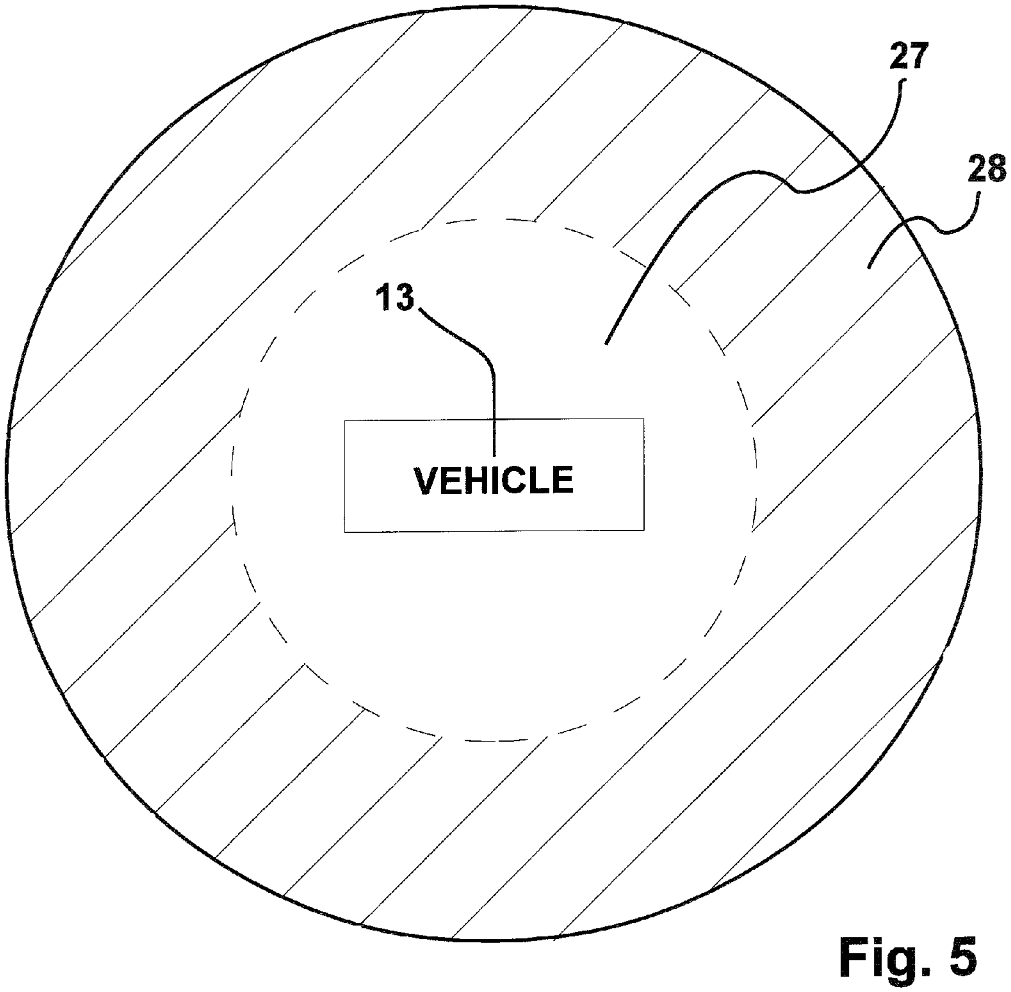
FIG. 5 is a graphic drawing of operation parameters of the system for proximity location and utilization.

Referring now to FIG. 5 of the drawings, a graphic representation of the operational zones for the slave unit and master control unit 12 and 11 respectively can be seen. In this example, a ten foot radius non-alert zone 27 from the slave unit 12 is illustrated allowing a primary control user (not shown), a non-alarm activation area relative to the master control unit and therefore the vehicle 13 in this example. Conversely the alert zone 28 indicated by the shaded area defined by the proximity sensors 16 and 21 of the respective units outside and beyond the non-alert zone 27 defined. This zone feature assures that the master control unit 11 and thus the primary user will not exceed the non-alert zone 27 without activating the unit providing a deliberate response enablement and warning configuration which must be addressed.

Figure 4:
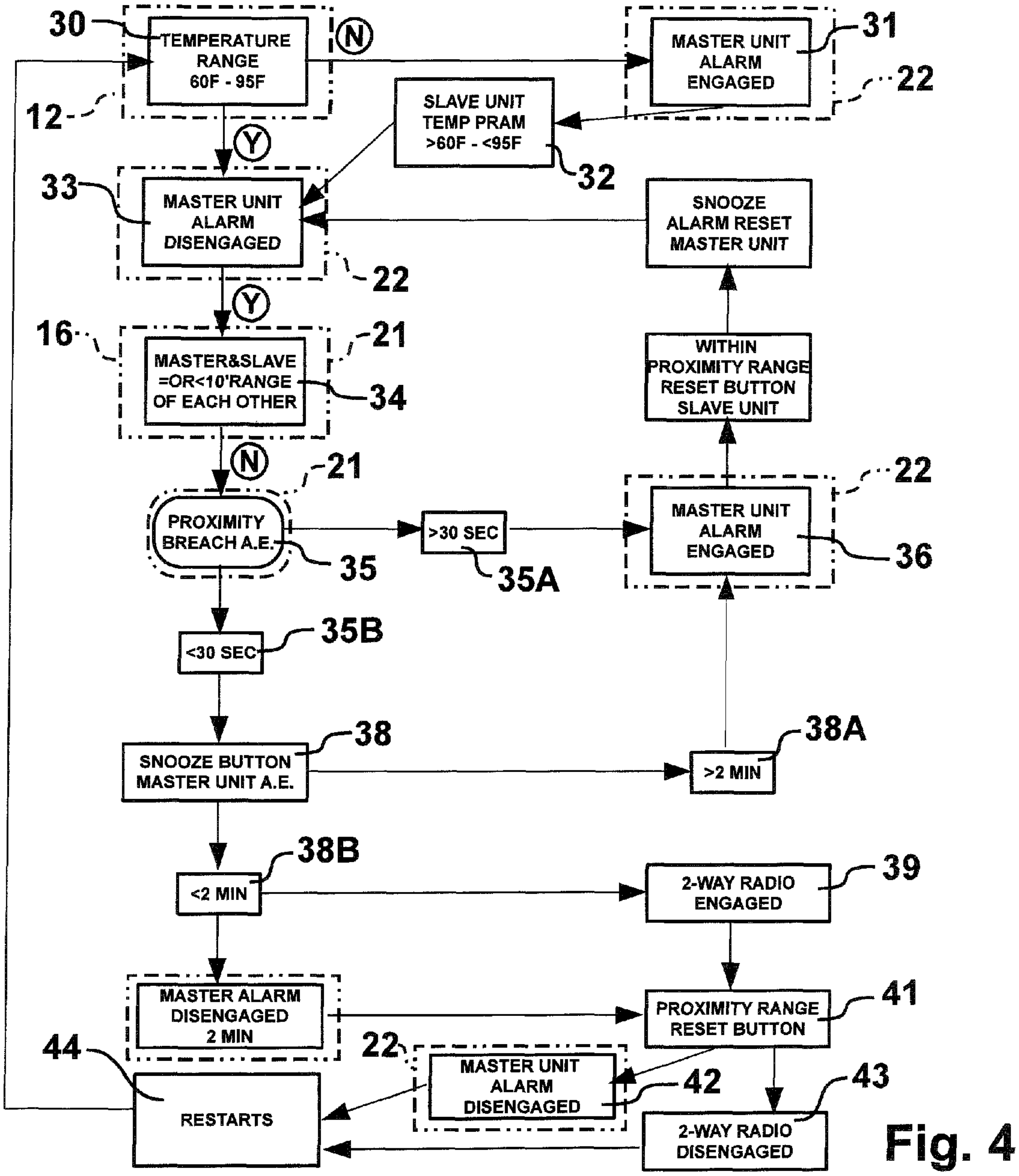
FIG. 4 is a functional block flow diagram of the thermal link system of the invention illustrating use pattern configuration.

Referring now to FIG. 4 of the drawings, a functional control activation block flow chart for the system can be seen. The temperature sensor 15 and the slave unit 12, in this example, defines a temperature non-activation range at 30. If the vehicle's temperature is outside the defined range (no) the slave unit 12 is activated and transmits a digital control activation signal to the master control unit 11 alarm engagement occurs indicated at 31.

When the slave unit 12 is returned to temperature parameters at 32 the master control unit 11 alarm 22 is disengaged at 33. The master control unit and slave units 11 and 12 proximity sensors 21 and 16 respectively determine and equal or less than designated radius non-alarm zone 27 at 34 if no the master control unit proximity 21 breach alert at two second warning beeps indicated at 35. If warning beeps activate at 35 duration is greater than thirty seconds at 35A, the master control unit 11 alarm 22 is engaged at 36.

If the warning beeps are less than thirty seconds at 35B indicating non-alarm zone 27 has been re-established.

If less than thirty seconds at 35A, a two minute snooze button activation or master control unit 11 at 38 may be activated. If the time elapsed is greater than two minutes indicated at 38A (by not re-entering the non-alarm zone 27) the master control unit alarm 22 is engaged with an annoying audio output unit broadcast at 36. If less than two minutes elapses the primary operator can press the "snooze button" A at 38B "snooze time", master control unit 11 alarm 22 is disengaged for two minutes at 40 and the two-way radio communication is engaged and established as noted at 39.

Correspondingly, if the primary operator returns to the master control unit 11 to within the non-alert zone 27 and presses a reset button B on the slave unit 12 at the control point 41. Upon "reset" the master control alarm 22 is disengaged at 42 and a two-way radio communication via the respective transmitter receiver circuits is disengaged as indicated at 43.

The system is then reset for restart at 44 based on the above defined auto and use and activation control elements. The hereinbefore referred to integrated vehicle unlocking 26 feature will allow the primary user with the master control unit 11 to program a control button thereon to activate the automatic locking system of the vehicle 13 if so equipped. Accordingly a safety operational protocol sequence is required wherein programmable activation button is held down (not shown) until the initial LED blinks then the vehicle key remote fob (not shown) is pressed repeatedly until the indicator LED on the master control unit 11 is continuously on. This setting sequence is atypical of most learning control circuitry of remote telemetric equipment and in this instance will provide and avoid accidental locking of the vehicle when not indicated.

It will thus be seen that a new and novel vehicle safety system for unattended vehicles based on temperature parameters and proximity orientation has been illustrated and described and it will be apparent to those skilled in the art that various changes and modifications may be made thereto without departing from the spirit of the invention.

Therefore I claim:

1. A mobile alert detection system comprising, a mobile master control unit and at least one mobile slave monitoring unit in communication with said master control unit, proximity sensors in said respective control and slave monitoring units interacting with one another to determine the distance between the master and slave unit is acceptable, a temperature sensor in said slave unit in communication with an alarm and activation circuit in both the master and slave units responsive to proximity and temperature sensors, a two-way data and audio transmitter/receiver in the master and slave units and a time circuit in communication therewith, a vehicle remote lock interface transmitter in said master unit, means for alarm control interdiction based on pre-alarm audio warning as to proximity and temperature range determination.

2. The mobile alert detection system set forth in claim 1 wherein said master unit is in communication with multiple remote slave units.

3. The mobile alert detection system set forth in claim 1 wherein said mobile and slave units have a portable source of power.

4. The mobile alert detection system set forth in claim 1 wherein said means for alarm control interdiction comprises, a timing circuit activated by proximity and temperature sensors independently and jointly thereof.

5. The mobile alert detection system set forth in claim 1 wherein said alarm has audio output on the master and slave units.

6. The mobile alert detection system set forth in claim 1 wherein the two-way audio transmitter/receiver is automatically activated by the time circuit in response to a pre-programmed set of interdetermined time values.

7. The mobile alert detection system set forth in claim 1 wherein said slave unit is selectively secured to monitored entities, children, pets and the like.

8. The mobile alert detection system set forth in claim 1 wherein said proximity sensors on the master and slave units define a predetermined activation distance zone therebetween.

9. The mobile alert detection system set forth in claim 4 wherein said timing circuit is activated manually on said master and slave unit.

* * * * *